(12) United States Patent
Chesneau et al.

(10) Patent No.: US 11,011,983 B2
(45) Date of Patent: May 18, 2021

(54) METHOD OF ADJUSTING A PULSE WIDTH MODULATION SIGNAL

(71) Applicant: STMicroelectronics (Grenoble 2) SAS, Grenoble (FR)

(72) Inventors: David Chesneau, Grenoble (FR); Francois Amiard, Proveysieux (FR); Helene Esch, Seyssinet Pariset (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 16/570,660

(22) Filed: Sep. 13, 2019

(65) Prior Publication Data

US 2020/0099296 A1  Mar. 26, 2020

(30) Foreign Application Priority Data

Sep. 24, 2018  (FR) ...................................... 1858655

(51) Int. Cl.
*H02M 3/157* (2006.01)
*H02M 1/08* (2006.01)
*H02M 1/00* (2006.01)

(52) U.S. Cl.
CPC ............. *H02M 3/157* (2013.01); *H02M 1/08* (2013.01); *H02M 2001/0045* (2013.01)

(58) Field of Classification Search
CPC ........ H02M 3/158; H02M 3/157; H02M 1/08; H02M 3/156; H02M 2001/0016; H02M 2001/0022; H02M 2001/0041
See application file for complete search history.

(56) References Cited

U.S. PATENT DOCUMENTS

| 8,193,798 | B1 | 6/2012 | Pace et al. | |
|---|---|---|---|---|
| 8,937,466 | B2* | 1/2015 | Trattler | H05B 45/3725 323/282 |
| 9,667,145 | B1* | 5/2017 | Goenawan | H02M 3/156 |
| 2003/0160575 | A1* | 8/2003 | Weedon | H05B 39/047 315/291 |
| 2008/0265861 | A1* | 10/2008 | Wang | H02M 3/073 323/318 |
| 2012/0268972 | A1 | 10/2012 | Daigo et al. | |
| 2014/0266121 | A1* | 9/2014 | Wee | H02M 3/1588 323/283 |
| 2015/0137777 | A1* | 5/2015 | Chen | H02M 3/1588 323/271 |
| 2015/0145498 | A1* | 5/2015 | Zarkhin | H02M 3/156 323/288 |
| 2017/0005575 | A1* | 1/2017 | Wang | H02M 3/156 |

FOREIGN PATENT DOCUMENTS

JP  2014161146 A  9/2014

* cited by examiner

*Primary Examiner* — Alex Torres-Rivera
(74) *Attorney, Agent, or Firm* — Slater Matsil, LLP

(57) ABSTRACT

A method can be used for regulating a pulse-width modulation signal that is driving a voltage-buck switched-mode voltage regulator. The method includes comparing an input voltage of the switched-mode voltage regulator with a threshold voltage. The frequency of the pulse-width modulation signal is decreased when the input voltage is lower than the threshold voltage. The frequency is not decreased when the input voltage is not lower than the threshold voltage.

20 Claims, 2 Drawing Sheets

METHOD OF ADJUSTING A PULSE WIDTH MODULATION SIGNAL

CROSS-REFERENCE TO RELATED APPLICATIONS

This application claims priority to French Patent Application No. 1858655, filed on Sep. 24, 2018, which application is hereby incorporated herein by reference.

TECHNICAL FIELD

Implementations and embodiments of the invention relate to a method of adjusting a pulse width modulation signal driving a buck switched mode voltage regulator.

BACKGROUND

In general, a conventional voltage-buck switched-mode power supply 1 includes, as illustrated in FIG. 1, a voltage-regulating circuit, or regulator, 2 including an input 3 that is intended to receive an input voltage Vin, a power switch 4 having a closed state and an open state, an inductor 5 that is configured to store energy, a load 6 and a diode 7.

The voltage-regulating circuit 2 is configured to deliver an output voltage Vout that is lower than the input voltage Vin to the load.

When the power switch 4 is in the closed state, the diode 7 is in the off state and the current flowing through the inductor 5 increases.

When the power switch 4 is in the open state, the diode 7 is in the on state and the current flowing through the inductor 5 decreases.

The power switch 4 and the diode 7 are generally formed by transistors, here for example by a first transistor T1 and a second transistor T2.

The closed/open state of the first transistor T1 and the on/off state of the second transistor T2 are driven by a pulse-width modulation signal Spwm delivered by a control circuit 8 for controlling the switched-mode power supply 1.

The control circuit 8 is intended to receive a reference voltage Vref in order to set the output voltage Vout of the voltage regulator 2 via the pulse-width modulation signal Spwm.

The frequency or the period of the signal Spwm is generally dictated by a clock signal Clk.

As illustrated in FIG. 2, each period Tpwm of the signal Spwm includes a first phase P1 having a duration D1 in which the power switch 4 is in the closed state and the diode 7 is in the off state, and a second phase P2 having a duration D2 in which the power switch 4 is in the open state and the diode 7 is in the on state.

The duty cycle RC of the signal Spwm is equal to D1/Tpwm or 1-D2/Tpwm and this duty cycle RC can vary according to the input Vin and output Vout voltages.

When there is only low dropout, for example lower than 0.4 V, between the input Vin and output Vout voltages, the switched-mode power supply operates in a low-dropout voltage mode.

In this case, the duty cycle RC of the signal Spwm remains high, i.e. close to 100%, so as to maintain the functionality of the voltage-buck switched-mode power supply.

However, since the control circuit 8 still exhibits an intrinsic latency in generating the signal Spwm, the duration D2 of the second phase P2 cannot therefore be completely eliminated. Consequently, the duty cycle of the signal Spwm is limited by the latency and cannot reach 100%.

One conventional solution proposes limiting the input voltage Vin of a voltage-buck switched-mode power supply so as to avoid the constraint of a high duty cycle.

However, such a solution substantially limits the working range of the power supply.

There is also another conventional solution in which it is sought to decrease the intrinsic latency of the control circuit 8 so as to increase the duty cycle.

However, a slight improvement in the duty cycle RC is obtained at the price of high complexity, and substantially increased silicon area and power consumption.

There is thus a need to provide a technical solution exhibiting low complexity, low power consumption and a small silicon footprint allowing the duty cycle of the pulse-width modulation signal, or in other words the performance of the voltage-buck switched-mode power supply, to be increased without limiting its working range.

SUMMARY

Implementations and embodiments of the invention relate to switched-mode power supplies, and more particularly to voltage-buck switched-mode power supplies driven by pulse-width modulation (PWM) signals.

According to one aspect, a method for regulating a pulse-width modulation signal intended to drive a voltage-buck switched-mode voltage regulator. The method comprises comparing an input voltage of the switched-mode voltage regulator with a threshold voltage and decreasing the frequency of the pulse-width modulation signal if the input voltage is lower than the threshold voltage.

Such a method advantageously makes it possible to regulate, according to the input voltage of the voltage regulator, the duty cycle of the pulse-width modulation signal simply by decreasing its frequency.

Decreasing the frequency of the pulse-width modulation signal in this way simultaneously results in an increase in the period of the pulse-width modulation signal, which advantageously increases the ripple in the current flowing through the power inductor of the switched-mode voltage regulator such that the voltage regulator is able to respond more quickly to a variation in its load.

Specifically, as explained above, the duration D2 of the second phase P2 of the period Tpwm is set by intrinsic properties of the control circuit delivering the pulse-width modulation signal.

Furthermore, as explained above, the duty cycle of the pulse-width modulation signal is equal to D1/Tpwm or 1-D2/Tpwm.

Therefore, if the minimum value of D2 is considered to be fixed, since it is defined by the intrinsic properties of the control circuit, increasing the period Tpwm of the pulse-width modulation signal allows the maximum duty cycle of the pulse-width modulation signal to be directly increased so as to increase the performance of the voltage-buck switched-mode voltage regulator, if need be.

According to one implementation, the operation of decreasing the frequency of the pulse-width modulation signal comprises decreasing the frequency of a clock signal that is intended to clock the pulse-width modulation signal.

Advantageously, decreasing the frequency of a clock signal in this way provides a technical solution exhibiting low complexity, low power consumption and a small footprint in terms of silicon area.

By way of non-limiting example, the decrease is a division of the frequency of the clock signal by two.

The threshold voltage may, for example, be chosen such that when the input voltage is lower than the threshold voltage, the voltage regulator operates in a low-dropout voltage mode.

A person skilled in the art will be able to choose this threshold voltage according to the envisaged application and/or the technology used, in particular.

By way of non-limiting example, a value of the order of 2.2 V for the threshold voltage may be chosen.

Such a method thus advantageously makes it possible to adjust the duty cycle of the pulse-width modulation signal when the voltage-buck switched-mode voltage regulator is in low-dropout voltage regulation mode so as to dynamically improve the performance of the regulator.

According to another aspect, a device can be used for regulating a pulse-width modulation signal that is intended to drive a voltage-buck switched-mode voltage regulator. This device comprises a comparison module that is intended to receive an input voltage of the switched-mode voltage regulator and a threshold voltage. The comparison module is configured to compare the input voltage and the threshold voltage. A control module is configured to decrease the frequency of the pulse-width modulation signal if the input voltage is lower than the threshold voltage.

According to one embodiment, the control module is configured to decrease the frequency of the pulse-width modulation signal by dividing a clock signal that is intended to clock the pulse-width modulation signal.

According to one embodiment, the control module is configured to decrease the frequency of the pulse-width modulation signal by dividing the frequency of the clock signal by two.

As mentioned above by way of non-limiting indication, the threshold voltage may be chosen such that when the input voltage is lower than the threshold voltage, the voltage regulator operates in a low-dropout voltage mode.

According to another aspect, what is provided is a voltage-buck switched-mode power supply comprising a device for regulating a pulse-width modulation signal such as defined above and a voltage-buck switched-mode voltage regulator that is driven by the pulse-width modulation signal.

According to another aspect, what is provided is a power supply management unit, comprising at least one voltage-buck switched-mode power supply such as defined above.

According to yet another aspect, what is provided is a microcontroller incorporating a power supply management unit such as defined above.

According to yet another aspect, what is provided is an electronic device such as a connected object, incorporating at least one microcontroller such as defined above.

BRIEF DESCRIPTION OF THE DRAWINGS

Other advantages and features of the invention will become apparent on examining the detailed description of completely non-limiting implementations and embodiments and the appended drawings, in which.

DETAILED DESCRIPTION OF ILLUSTRATIVE EMBODIMENTS

Figure 3:
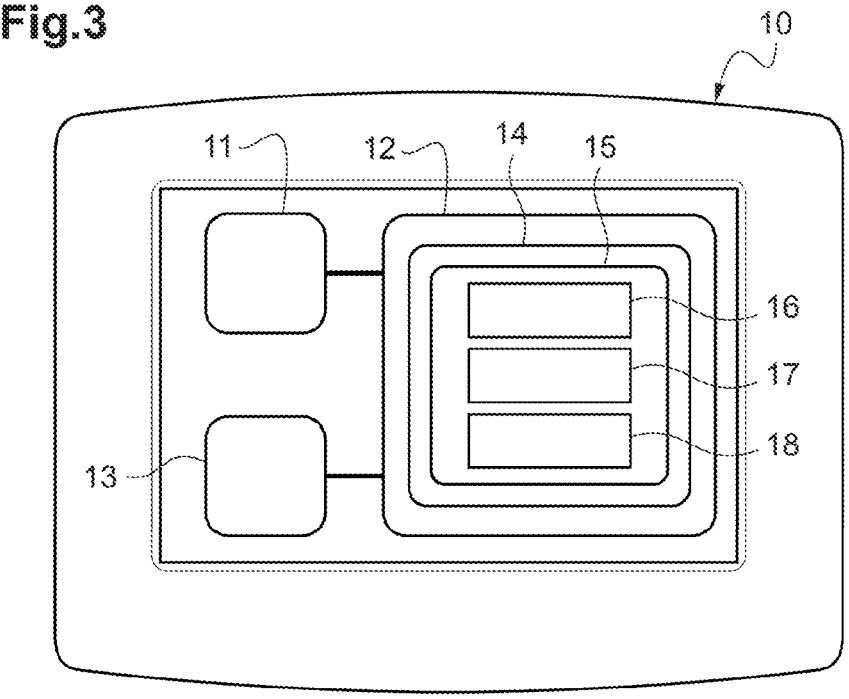
FIGS. 3 to 5 schematically illustrate implementations and embodiments of the invention.

The reference 10 in FIG. 3 refers to an electronic device, here for example a connected smart device taking the form of a connected thermostat 10.

The connected thermostat 10 comprises a detection module 11 that is configured to detect ambient parameters, such as the ambient temperature and the ambient humidity around the thermostat 10. A processing module 12 is coupled to the detection module 11 and is configured to process parameters detected by the detection module 11. A communication module 13 is coupled to the processing module 12 and is configured to communicate with another connected object or a computer server via an internet network.

The processing module 12 includes a microcontroller 14, here for example an STM32® microcontroller marketed by STMicroelectronics®.

The microcontroller 14 includes a power supply management unit 15 that is configured to dynamically manage various power supplies and includes at least one oscillator 16, a finite-state machine 17 (FSM) and at least one switched-mode power supply 18 that is configured to deliver one or more stable internal supply voltages.

For the sake of simplicity, only one voltage-buck switched-mode power source 18 is illustrated here by way of example.

Figure 4:
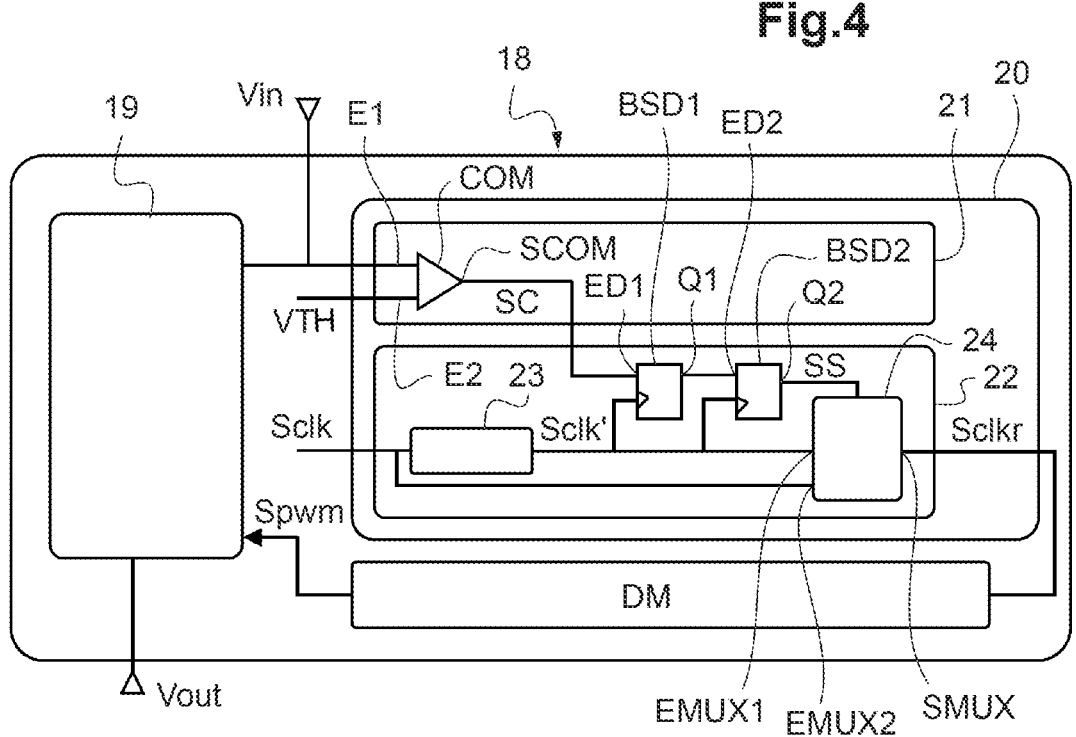

Reference is now made to FIG. 4 in order to illustrate the switched-mode power supply 18 in greater detail. It comprises a voltage-buck switched-mode voltage regulator 19 that is intended to receive an input voltage Vin and is configured to deliver an output voltage Vout that is lower than the input voltage Vin. A regulating device 20 is configured to deliver a pulse-width modulation signal Spwm to the switched-mode voltage regulator 19 so as to drive the switched-mode voltage regulator 19.

Figure 1:
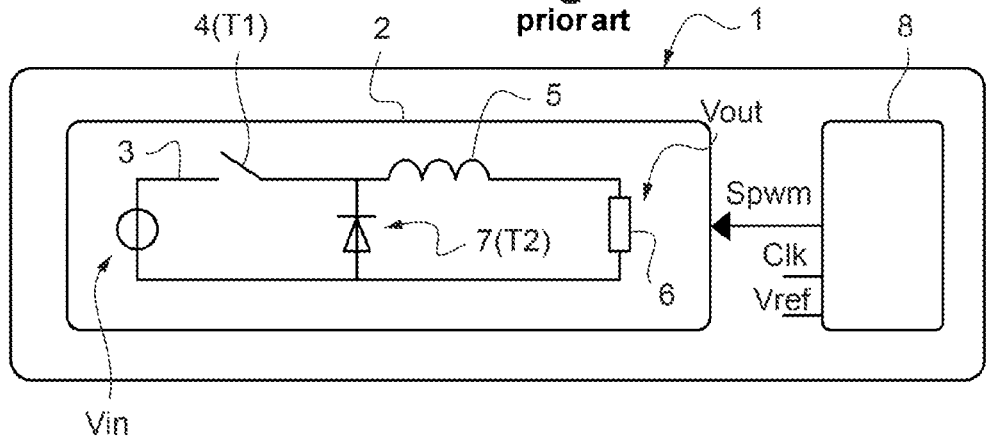
FIGS. 1 and 2 illustrate an example of the prior art.
Figure 2:
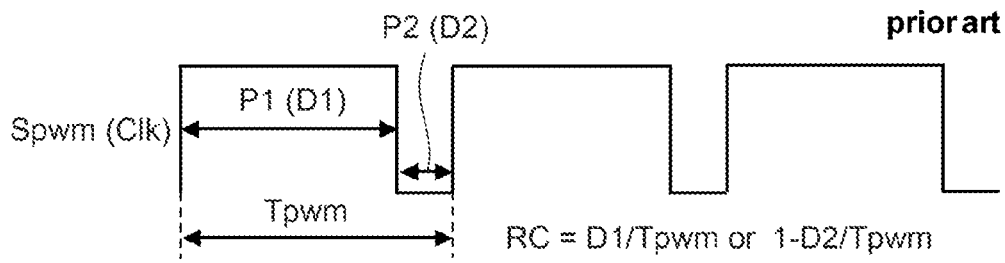

The switched-mode voltage regulator 19 may have any conventional and known structure, for example that illustrated in FIG. 1.

The regulating device 20 includes a comparison module 21 and a control module including a circuit 22 and a block DM.

The comparison module 21 includes a comparator COM, the first input E1 of which is intended to receive the input voltage Vin of the switched-mode voltage regulator 19 and the second input E2 of which is intended to receive a threshold voltage VTH.

The comparison module 21 is configured to deliver, at its output SCOM, a comparison signal SC according to the input voltage Vin and the threshold voltage VTH.

The comparison signal SC is in a first state, for example the high state, when the input voltage Vin is lower than the threshold voltage and the comparison signal SC is in a second state, for example the low state, otherwise.

The threshold voltage VTH is chosen such that the switched-mode power supply 18 is in low-dropout voltage regulation mode when the input voltage Vin is lower than this threshold voltage VTH, which in this example is substantially equal to 2.2 V.

The control module 22, DM is intended to receive a clock signal Sclk and is configured to generate the pulse-width modulation signal Spwm in time with the clock signal Sclk.

The circuit 22 includes a frequency divider 23 that is known per se and configured to decrease the frequency of the clock signal Sclk.

By way of example, the frequency divider 23 is configured to deliver a modified clock signal Sclk', the frequency of which is half that of the clock signal Sclk.

The circuit 22 also includes a first synchronous D flip-flop BSD1, the data input ED1 of which is intended to receive the comparison signal SC, and a second synchronous D flip-flop BSD2, the data input ED2 of which is coupled to the data output Q1 of the first flip-flop BSD1.

The first and second synchronous flip-flops BSD1 and BSD2 are clocked by the modified clock signal Sclk'.

The second synchronous flip-flop BSD2 is configured to deliver, at its output Q2, a selection signal SS that is representative of the comparison signal SC.

It should be noted that using a cascade of two flip-flops BSD1, BSD2 advantageously allows the risk of metastability, i.e. obtaining, at the output SCOM, a comparison signal SC that is asynchronous with respect to the modified clock signal Sclk', to be substantially decreased.

The circuit 22 further includes a multiplexer 24. The first input EMUX1 of the multiplexer 24 is intended to receive the clock signal Sclk, the second input EMUX2 is intended to receive the modified clock signal Sclk', and the selecting input is intended to receive the selection signal SS.

The multiplexer 24 is configured to deliver, at its output SMUX that is connected to the block DM, a regulated clock signal Sclkr that is intended to be used to clock in the pulse-width modulation signal Spwm.

When the input voltage Vin is lower than the threshold voltage VTH, the multiplexer that is controlled by the selection signal SS representative of the comparison signal SC selects the modified clock signal Sclk' as the regulated clock signal Sclkr.

Otherwise, the multiplexer selects the clock signal Sclk as the regulated clock signal Sclkr.

The block DM, which is intended to receive the regulated clock signal Sclkr, is configured to generate the pulse-width modulation signal Spwm on the basis of the regulated clock signal Sclkr. The block DM may have any conventional and known structure.

Figure 5:
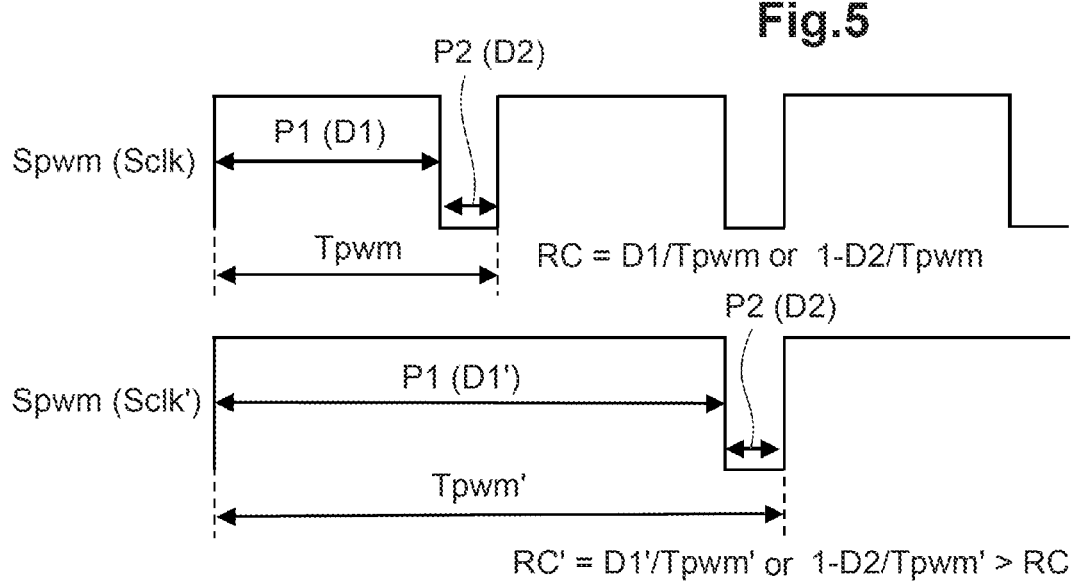

The upper portion of FIG. 5 illustrates the case in which the input voltage Vin is higher than or equal to the threshold voltage VTH.

In this case, the period of the pulse-width modulation signal Spwm is equal to Tpwm and the value of the duty cycle RC is 1-D2/Tpwm, where D2 denotes the duration of the second phase P2.

The lower portion of FIG. 5 illustrates the case in which the input voltage Vin is lower than the threshold voltage VTH.

In this case, the frequency of the pulse-width modulation signal Spwm in time with the modified clock signal Sclk' is decreased and the period Tpwm' of the pulse-width modulation signal Spwm is therefore increased with respect to that Tpwm of the pulse-width modulation signal Spwm in time with the clock signal Sclk.

Specifically, the duration D2 of the second phase P2 is fixed since it is defined by the intrinsic properties of the control module and the duration D1' of the first phase P1 increases with the increase in the period Tpwm', and the duty cycle RC' of the pulse-width modulation signal Spwm in time with the modified clock signal Sclk' is consequently increased.

Thus, the maximum duty cycle of the pulse-width modulation signal Spwm is increased so as to improve the performance of the voltage-buck switched-mode power supply 18, in particular when the supply 18 is operating in low-dropout voltage regulation mode because of its low input voltage Vin.

What is claimed is:

1. A method for regulating a pulse-width modulation signal that is driving a voltage-buck switched-mode voltage regulator, the method comprising:
    comparing an input voltage of the switched-mode voltage regulator with a threshold voltage; and
    decreasing a frequency of the pulse-width modulation signal when the input voltage is lower than the threshold voltage by
        decreasing a frequency of a clock signal to form a modified clock signal,
        passing the modified clock signal through a multiplexer as a regulated clock signal to a digital modulation circuit when the input voltage is lower than the threshold voltage,
        passing the clock signal through the multiplexer as the regulated clock signal to the digital modulation circuit when the input voltage is not lower than the threshold voltage, and
        generating the pulse-width modulation signal based on the regulated clock signal using the digital modulation circuit.

2. The method according to claim 1, wherein decreasing the frequency of the clock signal comprises dividing the frequency of the clock signal by two.

3. The method according to claim 1, wherein the threshold voltage is chosen such that when the input voltage is lower than the threshold voltage, the switched-mode voltage regulator operates in a low-dropout voltage mode.

4. The method according to claim 1, wherein decreasing the frequency of the clock signal comprises dividing the frequency of the clock signal using a frequency divider.

5. A method comprising:
    receiving an input voltage from a voltage-buck switched-mode voltage regulator;
    comparing the input voltage with a threshold voltage;
    receiving a clock signal;
    generating a modified clock signal that has a lower frequency than the clock signal using a frequency divider;
    generating a pulse-width modulation signal that is based on the modified clock signal by passing the modified clock signal received from the frequency divider through a multiplexer to a digital modulation circuit when the input voltage is lower than the threshold voltage; and
    generating a pulse-width modulation signal that is based on the clock signal passing the clock signal through the multiplexer to the digital modulation circuit when the input voltage is not lower than the threshold voltage; and
    applying the pulse-width modulation signal to the voltage-buck switched-mode voltage regulator.

6. The method according to claim 5, wherein the modified clock signal has a frequency that is half of a frequency of the clock signal.

7. The method according to claim 5, wherein the threshold voltage is chosen such that when the input voltage is lower than the threshold voltage, the switched-mode voltage regulator operates in a low-dropout voltage mode.

8. A device for regulating a pulse-width modulation signal that is intended to drive a voltage-buck switched-mode voltage regulator, the device comprising:
    a comparator configured to receive an input voltage of the switched-mode voltage regulator and a threshold voltage, and is configured to compare the input voltage and the threshold voltage; and
    a controller configured to
        decrease a frequency of the pulse-width modulation signal when the input voltage is lower than the threshold voltage by passing a modified clock signal having a lower frequency than a clock signal through a multiplexer to a digital modulation circuit, and not decrease the frequency of the pulse-width modulation signal when the input voltage is not lower than the threshold voltage by passing the clock signal through the multiplexer to the digital modulation circuit.

9. The device according to claim 8, wherein the controller is further configured to decrease the frequency of the pulse-width modulation signal by decreasing the frequency of the clock signal that is intended to clock the pulse-width modulation signal.

10. The device according to claim 9, wherein the controller is configured to decrease the frequency of the clock signal by dividing the frequency of the clock signal by two.

11. The device according to claim 8, wherein the threshold voltage is chosen such that when the input voltage is lower than the threshold voltage, the switched-mode voltage regulator operates in a low-dropout voltage mode.

12. The device according to claim 8, further comprising the voltage-buck switched-mode voltage regulator, which is configured to be driven by the pulse-width modulation signal.

13. The device according to claim 12, wherein the device is part of a power supply management unit.

14. The device according to claim 13, wherein the device is part of a microcontroller.

15. The device according to claim 14, wherein the device is part of a connected smart device.

16. The device of according to claim 8, further comprising:
 a first flip-flop having a data input coupled to an output of the comparator; and
 a second flip-flop having a data input coupled to a data output of the first flip-flop and a data output coupled to a selecting input of the multiplexer.

17. A device comprising:
 a voltage-buck switched-mode voltage regulator;
 a comparator with a first input coupled to the switched-mode voltage regulator and a second input coupled to a threshold voltage;
 a frequency divider having an input coupled to a clock signal node;
 a multiplexer having a first input coupled to the clock signal node and a second input coupled to an output of the frequency divider, the multiplexer having a control input coupled to an output of the comparator, wherein the multiplexer is configured to pass a signal from the frequency divider when a voltage at the first input of the comparator is lower than the threshold voltage and to pass a signal from the clock signal node when the voltage at the first input of the comparator is not lower than the threshold voltage; and
 a signal generator having an input coupled to an output of the multiplexer and an output coupled to the switched-mode voltage regulator.

18. The device according to claim 17, wherein the frequency divider is configured to receive an input signal having a first frequency and generate and output signal having a second frequency that is half the first frequency.

19. The device according to claim 17, wherein the threshold voltage is chosen such that the switched-mode voltage regulator operates in a low-dropout voltage mode when a voltage at the first input of the comparator is lower than the threshold voltage.

20. The device according to claim 17, further comprising:
 a first flip-flop having a data input coupled to the output of the comparator and a clock input coupled to the output of the frequency divider; and
 a second flip-flop having a data input coupled to a data output of the first flip-flop and a clock input coupled to the output of the frequency divider, the second flip-flop having a data output coupled to the input of the signal generator.

* * * * *